(12) United States Patent
Perry

(10) Patent No.: US 6,649,060 B2
(45) Date of Patent: Nov. 18, 2003

(54) SEPTIC TANK HAVING A SUPPORT SYSTEM AND MOLD FOR MANUFACTURING SAME

(75) Inventor: Carlos Perry, Manassas, VA (US)

(73) Assignee: E-Z Set Tank Company, Inc., Haymarket, VA (US)

( * ) Notice: Subject to any disclaimer, the term of this patent is extended or adjusted under 35 U.S.C. 154(b) by 0 days.

(21) Appl. No.: 09/875,042

(22) Filed: Jun. 7, 2001

(65) Prior Publication Data

US 2002/0185433 A1 Dec. 12, 2002

(51) Int. Cl.[7] .............................................. B01D 21/02
(52) U.S. Cl. .................... 210/532.2; 220/4.13; 220/653
(58) Field of Search ............................. 210/170, 532.2, 210/513, 532.1; 220/4.12, 4.13, 651, 653

(56) References Cited

U.S. PATENT DOCUMENTS

| | | | | |
|---|---|---|---|---|
| 1,281,528 A | * | 10/1918 | Davis | 210/532.2 |
| 2,360,525 A | * | 10/1944 | Sperry | 220/653 |
| 3,368,708 A | * | 2/1968 | Pflederer | 220/653 |
| 3,741,393 A | * | 6/1973 | Estes et al. | 210/532.2 |
| 4,325,823 A | * | 4/1982 | Graham | 210/170 |
| 4,961,670 A | * | 10/1990 | McKenzie et al. | 210/532.2 |
| 4,997,562 A | * | 3/1991 | Warner | 210/532.2 |
| 5,361,930 A | * | 11/1994 | Perry | 220/4.12 |
| 6,280,614 B1 | * | 8/2001 | Berg et al. | 210/170 |
| 6,328,890 B1 | * | 12/2001 | Thibault | 210/532.2 |

* cited by examiner

Primary Examiner—Christopher Upton
(74) Attorney, Agent, or Firm—McGuireWoods LLP

(57) ABSTRACT

A septic tank having internal supports. The internal supports may be lateral or vertical supports integrally molded to the septic tank. The internal supports provide structural support for the septic tank under various loading conditions. The supports will thus substantially prevent cracking of the septic tank, as well as deformation of the septic tank, manhole and other components thereof. A mold for manufacturing the septic tank is also provided.

16 Claims, 3 Drawing Sheets

SEPTIC TANK HAVING A SUPPORT SYSTEM AND MOLD FOR MANUFACTURING SAME

BACKGROUND OF THE INVENTION

1. Field of the Invention

The present invention generally relates to septic systems and, more particularly, to a septic tank having an internal support system and a mold for manufacturing the same.

2. Background Description

Septic systems are widely used for a variety of applications ranging from single family homes to industrial applications. These systems also vary greatly in design; namely, aerobic and anaerobic type systems. In either type of septic systems, the main objective is to treat wastewater in the most efficient manner in order to ensure that the water is properly filtered for distribution within a drain field or other distribution system.

In septic systems, a septic tank and other components are buried in the ground at a certain predetermined depth depending on many variables such as, for example, water tables, types of soil conditions, types of septic systems and the like. By way of example, in areas of high water tables, the septic tank may be buried at low depths leaving approximately six to eight inches of soil above the septic tank; whereas in other areas the septic tank may be buried at higher depths leaving approximately three or more feet of soil above the septic tank. Of course, the septic tank may also be buried at other depths depending on local ordinances and regulations or other engineering considerations.

Septic tanks may also include several components ranging from manholes for gaining access thereto as well as inlet and outlet pipes. Also, in most applications, the septic tanks are constructed from concrete or synthetic materials. In the case of using synthetic materials, a structural ribbed configuration is used to provide strength and durability to the septic tank, itself. The structural ribbed configuration may vary in spacing as well as wall thickness, depending on the specific application of the septic system. However, the use of small spacings between the structural ribs as well as the use of thicker walls leads to higher manufacturing costs due to more material being used to manufacture the septic tanks.

Once the septic systems and more particularly the septic tanks are properly buried in the ground, several external forces or loads are placed on the side walls and top portion of the septic tank. For example, in low water table areas, water will surround the septic tank resulting in high lateral stresses being placed on the side walls of the septic tank. In other areas, such as those with low freeze lines, the septic tank must be buried deep into the ground with upwards of three (3) feet or more of soil placed on a top portion of the septic tank. This amount of soil may cause both lateral and vertical stresses on the septic tank. In both of these situations, the septic tank may be designed with one or both thick walls and closely spaced structural ribs. Again, this leads to high manufacturing costs.

In either of the above situations, the use of both thick walls or closely spaced apart structural ribs still do not adequately protect the septic tank from damage. That is, the lateral or vertical loads imposed on the septic tank may cause cracking of the tank which results in leakage of wastewater. Also, these same loads may deform the manholes which result in inadequate sealing of the manhole cover over the manhole. In extreme cases, a catastrophic failure of the septic system may result; that is, the septic tank may collapse under the weight of the soil or other loads placed thereon. It is also known that the septic tank may begin to bow or sag causing the formation of sink holes in the overlying ground. The sink holes are both dangerous and aesthetically unpleasing.

The present invention is adapted to solving these and other problems.

SUMMARY OF THE INVENTION

An object of the present invention is to provide a septic tank which can withstand either or both lateral and vertical stresses caused by loads being placed on the walls of the septic tank.

Another object of the present invention is to prevent cracking of the septic tank.

A further object of the present invention is to prevent wastewater from leaking from the septic tank.

A still further object of the present invention is to prevent deformation of a manhole of the septic tank in order to provide a proper seal between the manhole and a manhole cover.

Still another object of the present invention is to provide a septic tank with low manufacturing costs.

A still further object of the present invention is to provide a septic tank which will not collapse or deform under external loads.

In one aspect of the present invention, a septic system having a septic tank with a sidewall, a top portion and a bottom portion is provided. The septic system also has at least one support structure disposed within the septic tank for providing structural support to the septic tank.

In another aspect of the present invention, at least one support is integrally molded to an interior portion of the septic tank. The septic tank includes opposing sidewalls, a top portion and a bottom portion.

A mold is also provided for molding the septic tank. The mold may be either separable mold portions or an integral mold forming the top, bottom and sidewalls of the septic tank. In the separable mold portions, extensions are provided and in the integral mold pins are provided to form the supports.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

The present invention is directed to a septic tank having a support system disposed within an interior portion and a method of manufacturing the septic tank and support system of the present invention. The support system as well as the septic tank are preferably manufactured from molded synthetic material such as, for example, plastic, fiberglass, polyethylene, polyvinyl chloride (PVC) and other like moldable materials. The support system of the present is preferably molded to opposing portions of a sidewall and/or top portion of the septic tank and may include one or more supports. The septic tank, itself, may be of any known size and shape such as, for example, a tank ranging from 500 to 2000 gallons having a round, square or other shape. For purposes of the present discussion, it should be understood by those of ordinary skill in the art that the septic tank may be less than 500 gallons or more than 2000 gallons depending on the particular application. It is thus well understood that the sizes and materials discussed herein are provided for illustrative purposes and that other sizes and materials may equally be used with the present invention without limitation.

In the embodiments of the present invention, the one or more supports provide structural support to the septic tank. The supports are thus designed to prevent the deformation of the septic tank, including bowing, cracking, collapsing and the like under various soil and water conditions and other environmental conditions. These supports are preferably integrally molded into the septic tank, and may be used with other supporting features such as structural ribs or other external support structures. The supports may extend between any of the opposing walls or between the top and bottom portion of the septic tank or any combination thereof.

Figure 1:
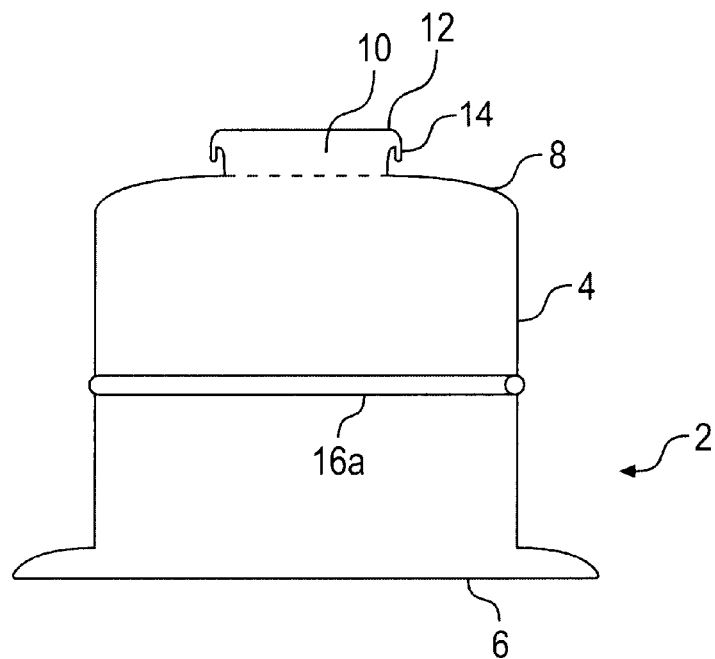
FIG. 1 shows a side view of a first embodiment of a septic tank of the present invention.

Referring now to the drawings, and more particularly to FIG. 1, there is shown a side view of the septic tank of the present invention. The septic tank is generally depicted as reference numeral 2, and includes sidewalls 4, a bottom portion 6 and a top portion or wall 8. One or more manholes 10 may be disposed on the top portion 8 of the septic tank 2. The manhole 10 allows access to the interior portion of the septic tank 2 for cleaning or other known purposes. A manhole cover 12 is placed on the manhole 10. A seal 14 may be disposed between the manhole 10 and the manhole cover 12. The septic tank of the present invention is preferably made from synthetic moldable material such as plastic, polyethylene or PVC.

Still referring to FIG. 1, at least one lateral support 16a is disposed between the opposing side walls 4 of the septic tank 2. The at least one lateral support 16a is preferably integrally molded to the sidewalls 4, and is further disposed parallel to either the bottom portion 6 or the top portion 8 of the septic tank 2. Said otherwise, the one or more lateral supports 16a are preferably disposed perpendicular to the sidewalls 4. It should be understood by those of ordinary skill in the art that one, two or more lateral supports 16a may be disposed between any of the sidewalls. For example, one centrally located lateral support 16a may be disposed within a 500 gallon septic tank 2 buried in sandy soil conditions. However, two or more lateral supports 16a may be used in the same sized tank, but which is buried in soil with a high water table. In the later scenario, more supports may be needed in order to compensate for the larger loads placed on the sidewalls by the water disposed on the sides of the septic tank 2.

Figure 2:
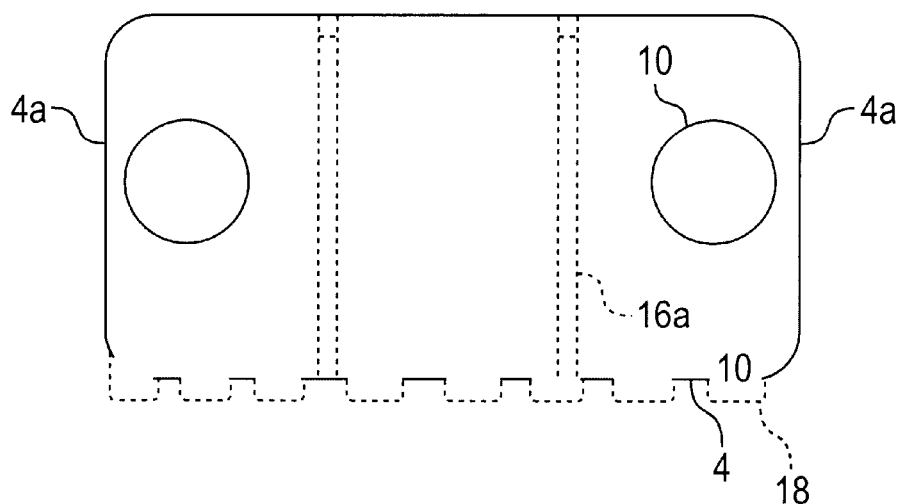
FIG. 2 shows a top view of the septic tank of FIG. 1.

FIG. 2 shows a top view of the septic tank 2 of FIG. 1. In this view, it is clearly shown that two lateral supports 16a extend between the opposing sidewalls 4. In an embodiment of the present invention, the two lateral supports 16a are equally spaced between the opposing side walls 4. It should be understood by those of ordinary skill in the art that more or less than two lateral supports 16a may extend between the sidewalls 4, and that these lateral supports 16a may also extend between the sidewalls 4a (or both sidewalls 4 and sidewalls 4a). FIG. 2 further shows the use of structural ribs 18, although the use of these structural ribs 18 are not critical to the understanding of the present invention.

Figure 3:
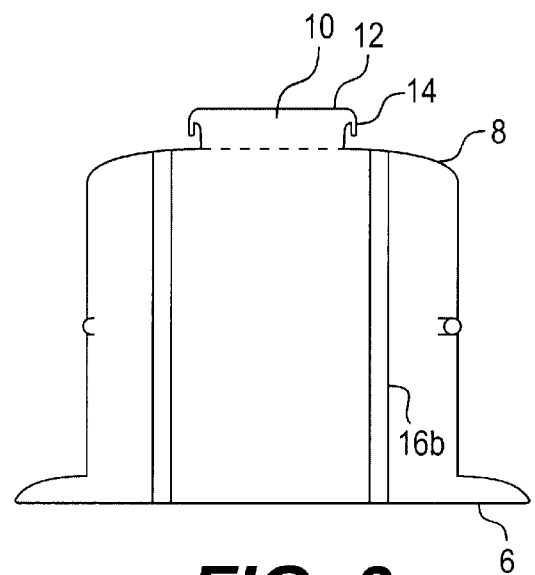
FIG. 3 shows a side view of another embodiment of a septic tank of the present invention.

FIG. 3 shows a side view of the septic tank 2 with vertical supports 16b. Specifically, the vertical supports 16b are disposed between the bottom portion 6 and the top portion 8 of the septic tank 2. In embodiments of the present invention, the vertical supports 16b are integrally molded to both the bottom portion 6 and the top portion 8 of the septic tank 2. Although two vertical supports 16b are shown, it should be well understood by those of ordinary skill in the art that more or less than two vertical supports 16b may extend between the bottom portion 6 and the top portion 8 of the septic tank 2 depending on the size of the septic tank 2 and the specific loads being placed thereon. For example, one centrally located vertical support 16b may be disposed within a 500 gallon septic tank 2 used in a region with a high water table. This is because under such conditions, the septic tank 2 may only have six to eight inches of soil placed on the top portion 8 resulting in very low vertical loads or stresses being placed thereon.

Figure 4:
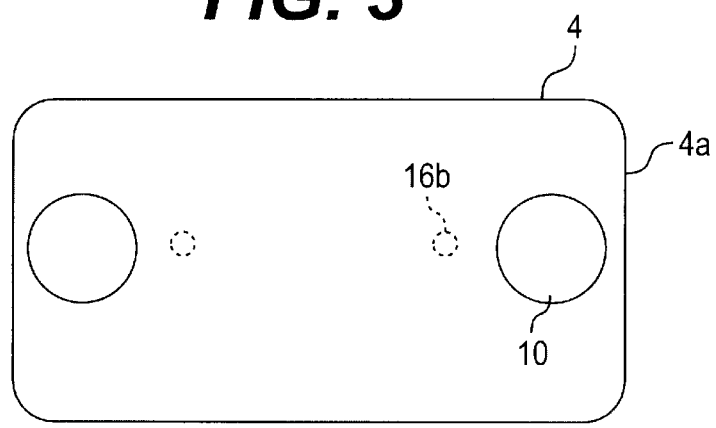
FIG. 4 shows a top view of the septic tank of FIG. 3.

FIG. 4 shows a top view of the septic tank 2 of FIG. 3. In this view, it is shown that the vertical supports 16b are equally spaced from the side walls 4 and 4a as well as the manholes 10. One of the ideal spacings of the vertical supports 16b would result in a symmetry of the vertical supports 16b within the septic tank 2. This same symmetry may also be preferred for the lateral supports 16a.

Figure 5:
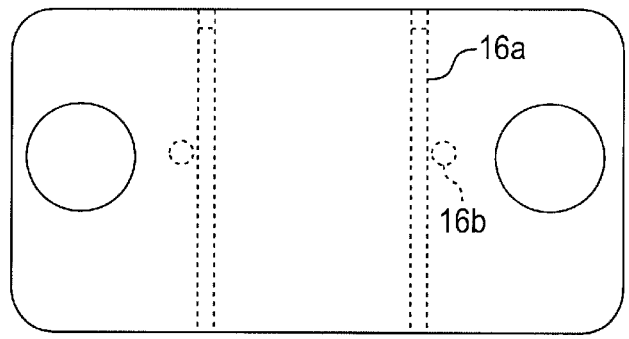
FIG. 5 shows a top view of an embodiment of the septic tank of the present invention.

FIG. 5 shows a top view of the septic tank 2. As seen in this view, both the lateral supports 16a and the vertical supports 16b may be disposed simultaneously within the septic tank 2. Again, depending on the size of the septic tank 2 and the anticipated load being placed thereon, more or less than two lateral supports 16a and two vertical supports 16b may be disposed or integrally molded within the septic tank 2. For example, one centrally located lateral support 16a and one centrally located vertical support 16b may be symmetrically disposed within a 1000 gallon septic tank 2 which is buried in a region having a low freezing line.

Septic Tank Mold

Figure 6:
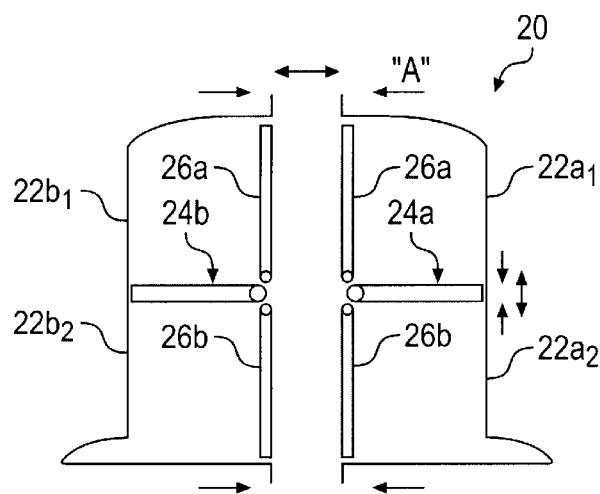
FIG. 6 shows a side view of a mold for molding the septic tank of the present invention.

FIG. 6 shows a side view of a mold for molding the septic tank of the present invention. The mold is generally depicted as reference numeral 20 and includes opposing portions $22a_1$ and $22b_1$ and $22a_2$ and $22b_2$. The opposing portions $22a_1$ and $22b_1$ and $22a_2$ and $22b_2$ of FIG. 6 are shown to be separated which, when moved together (along the direction of arrows "A"), are designed to form the sidewalls 4 (and 4a), the bottom portion 6 and the top portion 8 of the septic tank 2. The mold 20 may also form the manhole 10 as well as the inlet and outlet pipes.

At least two inward horizontal extensions 24a and 24b extend inwardly from respective opposing portions $22a_1$ and $22b_1$. The inward extensions 24a and 24b are used to form the lateral supports 16a and may equally extend inwardly from the opposing portions $22a_2$ and $22b_2$. Of course more inward horizontal extensions 24a and 24b may be used with the mold 20 in order to form more lateral supports 16a. Also extending inwardly from the opposing portions $22a_1$ and $22b_1$ and $22a_2$ and $22b_2$ are inward vertical extensions 26a and 26b used to form the vertical supports 16b.

It is noted that only a two piece mold may be necessary when molding either the lateral supports 16a or the vertical supports 16b. For example, when forming only the lateral supports 16a, the opposing portions $22a_1$ and $22a_2$ and the opposing portions $22b_1$ and $22b_2$ may be combined as respective single mold portions. Similarly, when forming only the vertical supports 16a, the opposing portions $22a_1$ and $22b_1$ and the opposing portions $22b_2$ and $22a_2$ may be combined as respective single mold portions.

Figure 7:
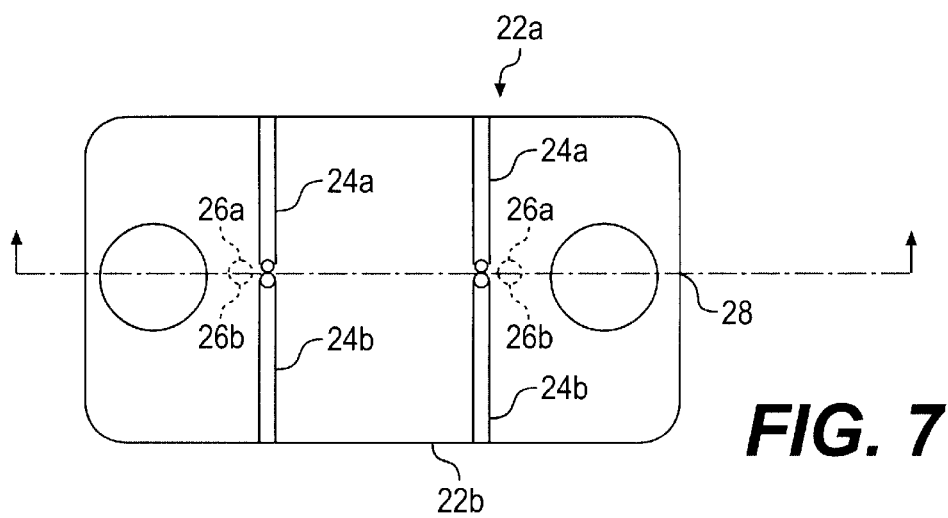
FIG. 7 shows a top view of the mold of FIG. 6.

FIG. 7 shows a top view of the mold of FIG. 6. In this view, the opposing portions $22a_1$ and $22b_1$ and $22a_2$ and $22b_2$ are engaged with one another thereby forming a mold parting line 28. Another molding parting line may also be formed in the horizontal direction of the mold. In the engaged position, the inward extensions 24a and 24b and 26a and 26b are also engaged forming respective single extensions used to form the lateral and vertical supports.

Figure 8:
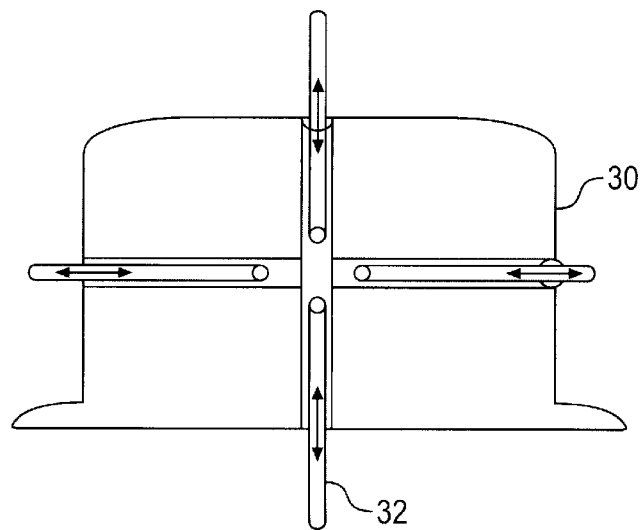
FIG. 8 is a flow chart showing a molding process using the mold of FIG. 6.

FIG. 8 shows another mold for molding the septic tank of the present invention. In this mold, a single integral mold 30 is shown. Pull pins 32 may be inserted within the side walls or the top and bottom portions of the mold 30 to form the lateral and vertical supports, respectively. The number and placement of the vertical and lateral supports may be varied by simply varying the number and placement of the pull pins 32 (inserted and withdrawn from the mold 30).

While the invention has been described in terms of preferred embodiments, those skilled in the art will recognize that the invention can be practiced with modification within the spirit and scope of the appended claims.

I claim:

1. A septic system, comprising:
   a septic tank having a sidewall, a top portion and a bottom portion; at least one beam support structure disposed within the septic tank and integrally molded and extending between at least one of (i) opposing portions of the sidewall and (ii) the top portion and the bottom portion for providing structural support to the septic tank and for preventing deformation to the septic tank.

2. The septic system of claim 1, wherein the at least one beam support structure and the septic tank are molded from a synthetic material.

3. The septic system of claim 2, wherein the synthetic material is polyvinyl chloride (PVC), plastic, polyethylene or fiberglass.

4. The septic system of 1, wherein the at least one beam support structure is two or more beam support structures.

5. The septic system of claim 1, wherein the at least one beam support structure is a lateral support integrally molded between opposing portions of the sidewall of the septic tank.

6. The septic system of claim 1, wherein the at least one beam support structure is a vertical support integrally molded between the top portion and the bottom portion of the septic tank.

7. The septic system of claim 1, wherein the at least one beam support structure is at least one lateral beam support and at least one vertical beam support.

8. The septic system of claim 7, wherein the at least one lateral beam support and the at least one vertical beam support are integrally molded to an interior portion of the septic tank.

9. The septic system of claim 1, wherein the at least one beam support structure is at least one lateral beam support symmetrically disposed within the septic tank.

10. The septic system of claim 1, wherein the at least one beam support structure is at least one vertical beam support symmetrically disposed within the septic tank.

11. A septic system, comprising:
    a septic tank having opposing walls, a top portion and a bottom portion; and
    at least one beam support integrally molded to an interior portion of the septic tank and extending between either the opposing sidewalls of the top portion and the bottom portion for preventing deformation to the septic tank.

12. The septic system of claim 11, wherein the at least one beam support is a lateral beam support integrally molded to the opposing sidewalls.

13. The septic system of claim 11, wherein the at least one beam support is a vertical beam support integrally molded to the bottom portion and the top portion of the septic tank.

14. The septic system of claim 11, wherein the at least one beam support is at least one lateral beam support symmetrically disposed within the septic tank.

15. The septic system of claim 11, wherein the at least one beam support is at least one vertical beam support symmetrically disposed within the septic tank.

16. The septic system of claim 11, wherein the at least one beam support is at least one lateral beam support symmetrically disposed within the septic tank and at least one vertical beam support symmetrically disposed within the septic tank.

* * * * *